United States Patent
Mitchell (10) Patent No.: US 8,403,130 B1
(45) Date of Patent: Mar. 26, 2013

(54) CONVEYOR SYSTEMS HAVING INTERMEDIATE ROLLERS

(75) Inventor: Charles L. Mitchell, Madeira, OH (US)

(73) Assignee: Conveyor Technologies, Inc., Milford, OH (US)

(*) Notice: Subject to any disclaimer, the term of this patent is extended or adjusted under 35 U.S.C. 154(b) by 0 days.

(21) Appl. No.: 13/433,409

(22) Filed: Mar. 29, 2012

(51) Int. Cl.
    *B65G 47/76* (2006.01)
(52) U.S. Cl. .......... 198/835; 198/847; 198/637
(58) Field of Classification Search .......... None
    See application file for complete search history.

(56) References Cited

U.S. PATENT DOCUMENTS

| | | | |
|---|---|---|---|
| 3,186,536 A * | 6/1965 | Hinchcliffe | 198/846 |
| 4,008,801 A | 2/1977 | Reilly et al. | |
| 4,015,484 A | 4/1977 | Taylor | |
| 4,756,659 A | 7/1988 | Bader | |
| 4,775,047 A * | 10/1988 | Grall | 198/861.2 |
| 4,809,841 A | 3/1989 | Kitamura | |
| 5,314,059 A * | 5/1994 | Clopton | 198/860.1 |
| 6,360,869 B1 | 3/2002 | Itoh et al. | |
| 6,685,005 B2 | 2/2004 | Youn | |
| 6,712,193 B2 * | 3/2004 | Dingeldein et al. | 198/367 |
| 7,137,501 B2 | 11/2006 | Van Wijngaarden et al. | |
| 7,416,073 B1 | 8/2008 | Talken et al. | |
| 2003/0047423 A1 | 3/2003 | Youn | |
| 2003/0127303 A1 | 7/2003 | Dingeldein et al. | |

* cited by examiner

*Primary Examiner* — Kavel Singh
(74) *Attorney, Agent, or Firm* — Dinsmore & Shohl LLP (57) ABSTRACT

A conveyor system includes a frame, a drive roller carried by the frame, and a tail roller carried by the frame. The drive roller and the tail roller each include a relief channel positioned around a roller circumference. The conveyor system further includes a first intermediate roller positioned between the drive roller and the tail roller and carried by the frame, where the first intermediate roller has a channel positioned around a first intermediate roller circumference. The conveyor system also includes a continuous flexible belt positioned around the drive roller and the tail roller, where the continuous flexible belt has an exterior surface, an interior surface, and a guide extending inwards from the interior surface. The guide is positioned within the channel of the first intermediate roller and the guide is spaced apart from the drive roller relief channel and the tail roller relief channel.

20 Claims, 6 Drawing Sheets

CONVEYOR SYSTEMS HAVING INTERMEDIATE ROLLERS

TECHNICAL FIELD

The present specification generally relates to conveyor systems and, more specifically, conveyor systems that include intermediate rollers that contact a guide of a continuous flexible belt.

BACKGROUND

Conveyor systems are used in a variety of industries to move material throughout a work area. In particular, low profile conveyor systems are used to transport materials in applications where the conveyor fits into tight spaces and/or under equipment where clearance is small. The flexible belts of conveyor systems are prone to misalignment due to out-of-balance forces acting on the belt in a direction generally transverse to the direction of flexible belt travel. Application of such unbalanced forces may displace the flexible belt on the rollers of the conveyor system, potentially damaging the flexible belt and resulting in downtime of the conveyor system.

Accordingly, conveyor systems that resist belt displacement to prevent downtime are required.

SUMMARY

In one embodiment, a conveyor system includes a frame, a drive roller carried by the frame, and a tail roller carried by the frame. The drive roller includes a drive roller relief channel positioned around a drive roller circumference. The tail roller includes a tail roller relief channel positioned around a tail roller circumference. The conveyor system further includes a first intermediate roller positioned between the drive roller and the tail roller and carried by the frame, where the first intermediate roller has a channel positioned around a first intermediate roller circumference. The conveyor system also includes a continuous flexible belt positioned around the drive roller and the tail roller, where the continuous flexible belt has an exterior surface, an interior surface, and a guide extending inwards from the interior surface. The guide is positioned within the channel of the first intermediate roller and the guide is spaced apart from the drive roller relief channel and the tail roller relief channel.

In another embodiment, a conveyor system includes a frame, a drive roller carried by the frame, and a tail roller carrier by the frame. The conveyor system also includes a continuous flexible belt positioned around the drive roller and the tail roller, where the continuous flexible belt has an exterior surface, and interior surface, and a guide extending outwards from the exterior surface. The conveyor system also includes a first intermediate roller positioned between the drive roller and the tail roller, where the first intermediate roller has a channel positioned around a first intermediate roller circumference. The guide is positioned within the channel of the first intermediate roller.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
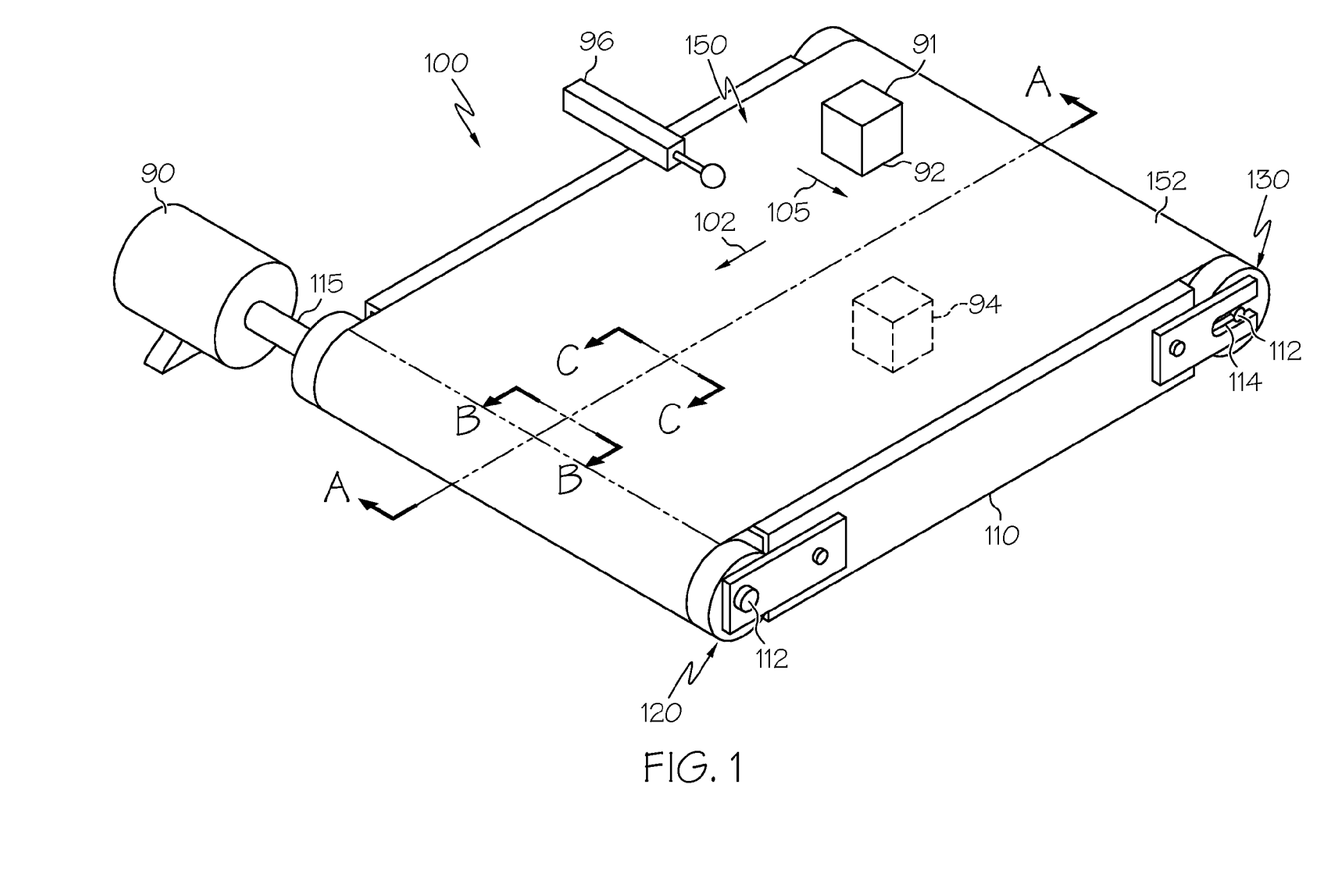
FIG. 1 schematically depicts a perspective view of a conveyor system having intermediate rollers according to one or more embodiments shown or described herein.
Figure 2:
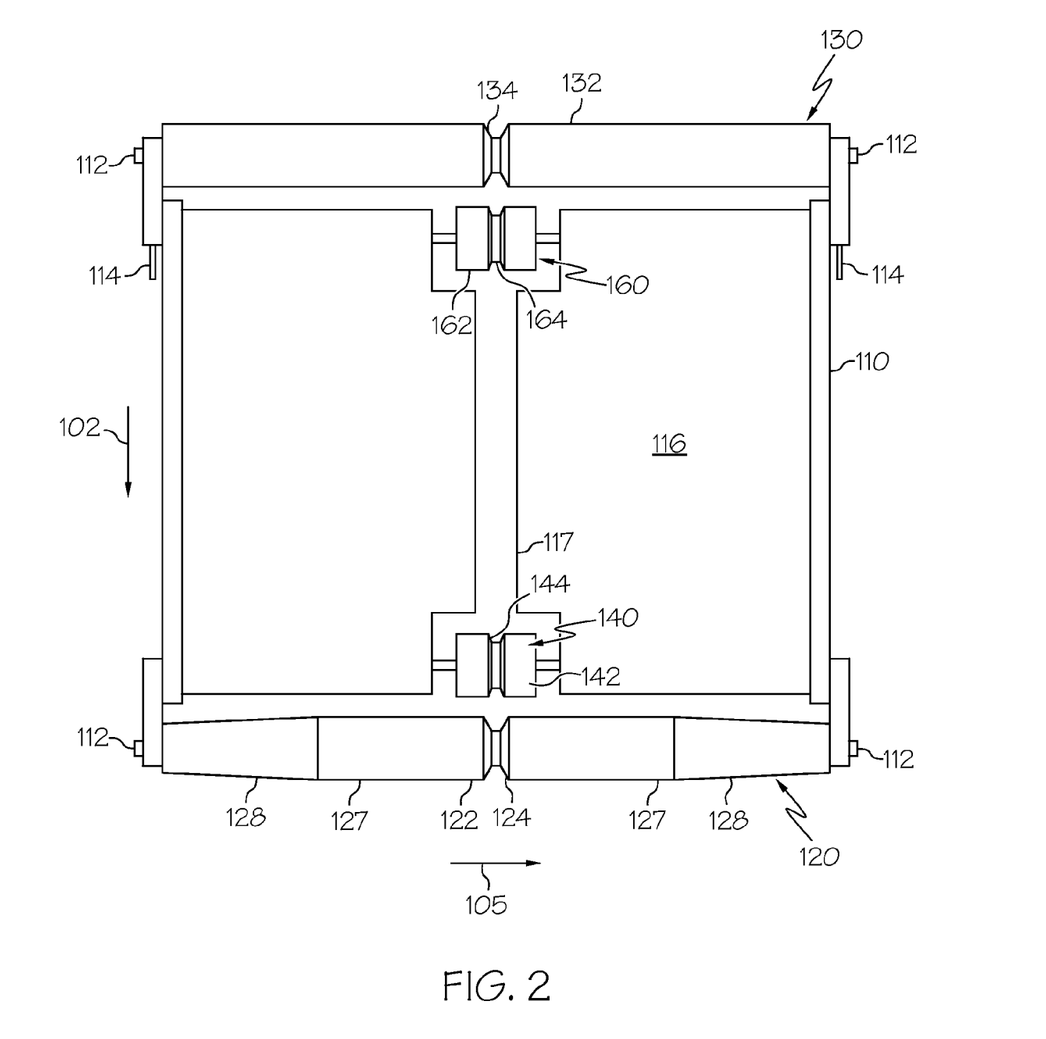
FIG. 2 schematically depicts a top view of a conveyor system having intermediate rollers with components removed for clarity according to one or more embodiments shown or described herein.

FIGS. 1 and 2 generally depict a conveyor system having a drive roller and a tail roller. The conveyor system includes at least one intermediate roller positioned between the drive roller and the tail roller, where the intermediate rollers have channels around their circumferences. The conveyor system also includes a continuous flexible belt having a guide that extends from the belt. The guide is positioned within the channels of the intermediate rollers. The continuous flexible belt travels around the drive and tail rollers. When an actuation load is applied to the continuous flexible belt in a direction generally transverse to the direction of travel, the guide contacts the channels of the intermediate rollers, limiting transverse displacement of the continuous flexible belt. The conveyor systems having intermediate rollers will be described in more detail herein with specific reference to the appended drawings.

Referring to FIG. 1, one embodiment of the conveyor system 100 includes a frame 110, a drive roller 120 carried by the frame 110, and a tail roller 130 carried by the frame 110. The drive roller 120 and the tail roller 130 are coupled to the frame 110 with bearing elements 112. The bearing elements 112 allow the respective drive roller 120 or tail roller 130 to rotate freely. Both tail roller bearing elements 112 are coupled to the frame 110 with position adjustors 114. The position adjustors 114 allow a user to modify the distance between the drive roller 120 and the tail roller 130. The conveyor system 100 further includes a drive shaft 115 coupled to the drive roller 120 and a motor 90. The drive shaft 115 transfers torque from the motor 90 to the drive roller 120, rotating the drive roller 120, thereby allowing the motor 90 to apply a conveyance force to the conveyor system 100. The conveyor system 100 further includes a continuous flexible belt 150 at least partially wound about the drive roller 120 and the tail roller 130. The continuous flexible belt 150 travels around the drive roller 120 and the tail roller 130 in a direction of travel 102 that enables an object 91 to be moved in the direction of travel 102.

Referring now to FIG. 2, the drive roller 120 includes a drive roller relief channel 124 that is positioned around a drive roller circumference 122. The tail roller 130 similarly includes a tail roller relief channel 134 positioned around a tail roller circumference 132. The frame 110 further includes a slider bed 116 positioned along an upper side of the frame 110. The slider bed 116 includes an opening 117 that extends along the length of the slider bed 116. The opening 117 is generally oriented parallel with the drive roller relief channel 124 and the tail roller relief channel 134. In embodiments of the conveyor system 100, at least one of the drive roller 120 and the tail roller 130 is "crowned," or has a center section 127 that has a larger diameter than the tapered end sections 128 of the roller. In the embodiment depicted in FIG. 2, the center section 127 has the same diameter as the drive roller circumference 122. While specific mention has been made herein to the drive roller 120 being crowned, it should be understood that one or more of the drive roller 120 and the tail roller 130 may be crowned as required by a given end-user application.

The conveyor system 100 includes a first intermediate roller 140 positioned between the drive roller 120 and the tail roller 130. The first intermediate roller 140 includes a channel 144 positioned around a first intermediate roller circumference 142. In some embodiments, the conveyor system 100 also includes a second intermediate roller 160 positioned between the tail roller 130 and the first intermediate roller 140. The second intermediate roller 160 includes a channel 164 positioned around a second intermediate roller circumference 162. The first intermediate roller 140 and the second intermediate roller 160 are free to rotate independently of one another and independently of the drive roller 120 and the tail roller 130. The first intermediate roller 140 and the second intermediate roller 160 are each secured to the frame 110 with bearings as to maintain the position of the first intermediate roller 140 and the second intermediate roller 160, and to allow independent rotation. Additional intermediate rollers (i.e., a third intermediate roller) including the features of the first intermediate roller 140 and/or the second intermediate roller 160 may be positioned in the frame 110 between the drive roller 120 and the tail roller 130 to provide additional support to resist transverse loads, as will be described in more detail below.

Figure 3:
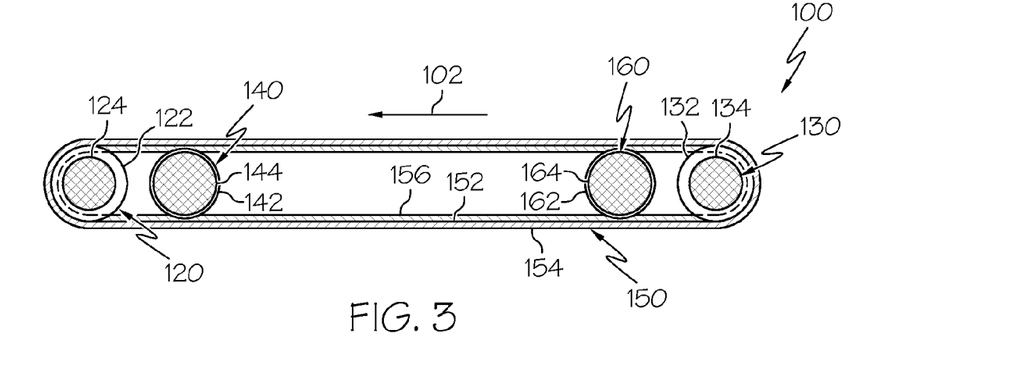
FIG. 3 schematically depicts a side sectional view of the conveyor system having intermediate rollers along line A-A of FIG. 1.

Referring now to FIG. 3, the continuous flexible belt 150 is depicted installed in the conveyor system 100. The continuous flexible belt 150 includes an interior surface 152, an exterior surface 154, and a guide 156 extending inwards from the interior surface 152. The continuous flexible belt 150 is positioned such that the interior surface 152 contacts the drive roller 120 and the tail roller 130. As the drive roller 120 rotates, frictional force between drive roller 120 and the continuous flexible belt 150 induces the continuous flexible belt 150 to feed around the drive roller 120 and the tail roller 130 in a direction of travel 102. The guide 156 of the continuous flexible belt 150 is positioned within the drive roller relief channel 124 and the tail roller relief channel 134 and spaced apart from the drive roller relief channel 124 and the tail roller relief channel 134.

Still referring to FIG. 3, a portion of the conveyor system 100 is depicted with the continuous flexible belt 150 installed over the drive roller 120 and the tail roller 130. As depicted, the diameter of the first intermediate roller circumference 142 is smaller than the diameter of the center section 127 of the drive roller 120. With the continuous flexible belt 150 subject to tension by the drive roller 120 and the tail roller 130 and no other external load applied to the continuous flexible belt 150, the first intermediate roller 140 is positioned such that the interior surface 152 of the continuous flexible belt 150 remains spaced apart from the first intermediate roller circumference 142. The diameter of the second intermediate roller circumference 162 is smaller than the diameter of the center section 127 of the drive roller 120. With the continuous flexible belt 150 subject to tension by the drive roller 120 and the tail roller 130 and no other external load being applied, the second intermediate roller 160 is positioned such that the interior surface 152 of the continuous flexible belt 150 remains spaced apart from the second intermediate roller circumference 162.

When installed onto the frame 110, the continuous flexible belt 150 is tensioned by the drive roller 120 and the tail roller 130 (i.e., by the position adjustors 114 shown in FIG. 1). A user may change the position of the tail roller 130 relative to the drive roller 120 by adjusting the position adjustors 114. By adjusting the distance between the drive roller 120 and the tail roller 130, the tension on the continuous flexible belt 150 is adjusted to a pre-determined setting.

Without being bound by theory, when the tail roller 130 is adjusted such that the continuous flexible belt 150 is subject to the proper tension, the tapered end sections 128 of the roller apply balanced force vector components that center the continuous flexible belt 150 on the drive and tail rollers 120, 130. Referring again to FIG. 2, when the continuous flexible belt 150 (not shown) shifts laterally in an offset direction 105 transverse to the direction of travel 102 along the crowned roller (i.e., the drive roller 120), the portion of the continuous flexible belt 150 contacting the tapered end section 128 in the offset direction 105 increases in size, while the portion of the continuous flexible belt 150 contacting the tapered end section 128 in the direction opposite the offset direction 105 decreases in size. Because of the increase in the force vector component by the tapered end sections 128, as the continuous flexible belt 150 shifts laterally in the offset direction 105, the reactive force on the portion of the continuous flexible belt 150 positioned over the tapered end section 128 in the offset direction 105 increases, thereby increasing the force vector component provided by the tapered end section 128 in the offset direction 105. Conversely, the reactive force on the portion of the continuous flexible belt 150 positioned over the tapered end section 128 opposite the offset direction 105 decreases, reducing the force vector component provided by the tapered end section 128 opposite the offset direction 105. Therefore, because of the difference between the force vector components applied by the tapered end sections 128, the continuous flexible belt 150 will shift laterally until the force vector components are balanced. Thus, the continuous flexible belt 150 "tracks straight" between the drive roller 120 and the tail roller 130 of the conveyor system 100.

The centering force applied to the continuous flexible belt 150 by the crowned roller may be limited due to the relative size of the center section 127 and the tapered end sections 128. Further, for conveyors having low length-to-width ratios, the continuous flexible belt 150 may be prone to further instabilities, as the force vector components applied to the continuous flexible belt 150 are applied relatively close to one another, and therefore have a higher likelihood of causing the continuous flexible belt 150 to mistrack on the drive and tail rollers 120, 130. Additionally, the centering force applied by the crowned roller may be limited due the maximum size of the drive roller circumference 122, which may be restricted based on the end-user application. In general, the smaller the drive roller circumference 122, the less centering force can be applied for the same tension of the continuous flexible belt 150. Accordingly, additional transverse support may be required for end-user applications where a large load is applied to the continuous flexible belt 150 in a direction transverse to the direction of travel 102.

Figure 4:
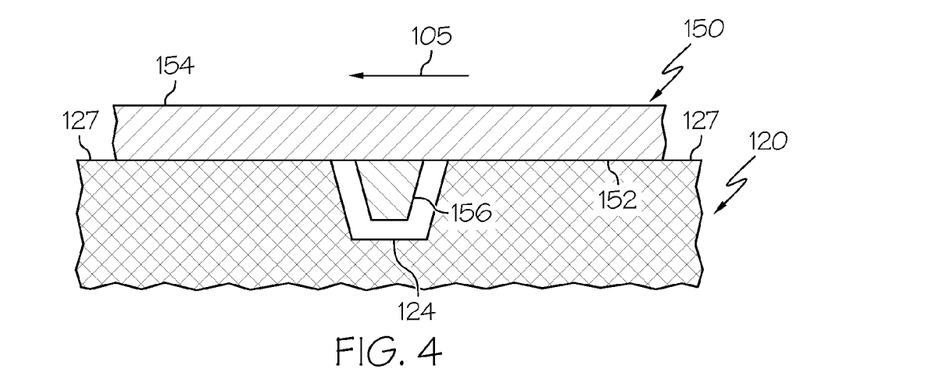
FIG. 4 schematically depicts a front sectional view of the conveyor system having intermediate rollers along line B-B of FIG. 1, depicting the drive roller and the continuous flexible belt.

Referring now to FIG. 4, the continuous flexible belt 150 is positioned such that the guide 156 passes through the drive roller relief channel 124 without contacting the drive roller 120. Similarly, while not shown, the guide 156 passes through the tail roller relief channel 134 without contacting the tail roller 130. Further, the continuous flexible belt 150 tracks straight without the guide 156 contacting the opening 117 in the slider bed 116. By maintaining spacing between the guide 156 and the drive roller 120, and the guide and the tail roller 130, the drive roller relief channel 124 and the tail roller relief channel 134 are prevented from applying a centering force to the guide 156 that tends to center the continuous flexible belt 150. Further, a force applied in the offset direction 105 does not cause the guide 156 to contact the drive roller 120 or the tail roller 130. As such, a gap is maintained between the guide 156 and the drive roller relief channel 124 (as depicted in FIG. 4) and the guide 156 and the tail roller relief channel 134 (not shown).

Figure 5:
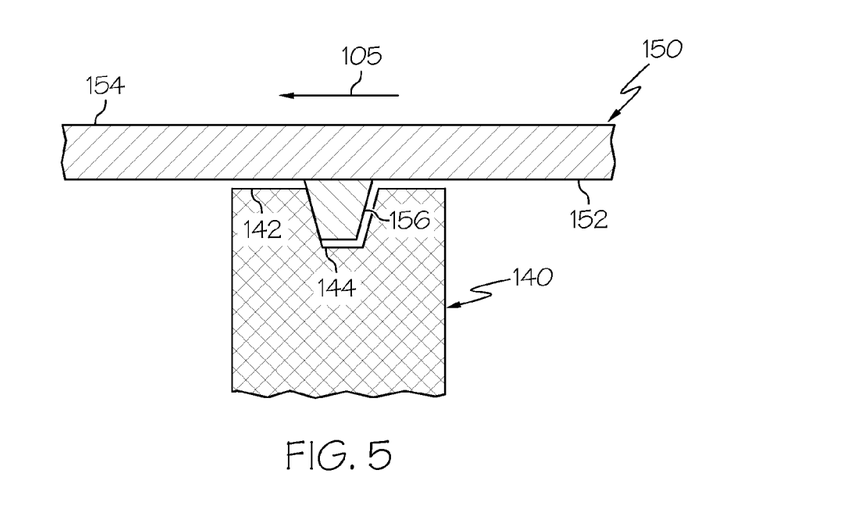
FIG. 5 schematically depicts a front sectional view of the conveyor system having intermediate rollers along line C-C of FIG. 1, depicting the first intermediate roller and the continuous flexible belt.

Referring now to FIG. 5, the first intermediate roller 140 is positioned transversely in the frame 110 such that the guide 156 of the continuous flexible belt 150 passes through the channel 144 of the first intermediate roller 140. As depicted in FIG. 5, the guide 156 includes a "v-shape" protrusion. Similarly, the channel 144 of the first intermediate roller 140 includes a shape to accommodate the v-shape of the guide 156. In some embodiments, the channels 144, 164 of the first and second intermediate rollers 140, 160 are sized relative to the guide 156 such that in some operating conditions of the conveyor system 100, the guide 156 is free from contact with the channels 144, 164. In other embodiments, the channels 144, 164 of the first and second intermediate rollers 140, 160 are sized relative to the guide 156 such that the guide 156 is in continuous contact with the channels 144, 164.

When a force is applied to the continuous flexible belt 150 in the offset direction 105, the continuous flexible belt 150 shifts in the offset direction 105 until the guide 156 contacts the channel 144 of the first intermediate roller 140. Similarly, while not shown, the second intermediate roller 160 is positioned in the frame 110 such that the guide 156 of the continuous flexible belt 150 passes through the channel 164 of the second intermediate roller 160. When a force is applied to the continuous flexible belt 150 in the offset direction 105, the continuous flexible belt 150 shifts in the offset direction 105 until the guide 156 contacts the channel 164 of the second intermediate roller 160. The first and second intermediate rollers 140, 160, therefore, limit deflection of the continuous flexible belt 150 when an external force is applied. The first and second intermediate rollers 140, 160 may assist the drive roller 120 and the tail roller 130 in maintaining the tracking of the continuous flexible belt 150 along the frame 110 of the conveyor system 100.

Referring again to FIG. 1, a conveyor system 100 according to the present disclosure is depicted installed for use in an end-user application. In the end-user application, the conveyor system 100 is used to convey an item 91 from a first position 92 towards a second position 94. Examples of such end-user applications include, without limitation, manufacturing, food processing, pharmaceutical processing, and logistics applications. When the item 91 reaches an interim position between the first position 92 and the second position 94, an actuator 96 engages the item 91 and applies an actuation load that is generally transverse to the direction of travel 102 of the continuous flexible belt 150. While the actuator 96 may apply the actuation load by contacting only the item 91, frictional force between the item 91 and the exterior surface 154 of the continuous flexible belt 150 transfers at least a portion of the actuation load to the continuous flexible belt 150 in a direction transverse to the direction of travel 102 (i.e., the offset direction 105).

While the tapered end sections 128 of the drive roller 120 may maintain the straight tracking of the continuous flexible belt 150, as discussed hereinabove, the application of the actuation load to the continuous flexible belt 150 in a direction transverse to the direction of travel 102 of the continuous flexible belt 150 may tend to drive the continuous flexible belt 150 away from tracking straight. Referring now to FIGS. 4 and 5, because of the positioning of the first intermediate roller 140 and the second intermediate roller 160, the guide 156 extending from the interior surface 152 of the continuous flexible belt 150 contacts the channels 144, 164, thereby limiting the lateral movement of the continuous flexible belt 150 in a direction transverse to the direction of travel 102. Further, because the drive roller relief channel 124 and the tail roller relief channel 134 are larger than the channels 144, 164 of the first and second intermediate rollers 140, 160, the guide 156 remains spaced apart from the drive roller relief channel 124 and the tail roller relief channel 134 when the guide 156 is in contact with the first and second intermediate rollers 140, 160.

Because the first and second intermediate rollers 140, 160 are free to rotate relative to the drive roller 120 and the tail roller 130, contact that induces rotation of the first and second intermediate rollers 140, 160 may not induce significant frictional forces on the continuous flexible belt 150. Referring again to FIG. 2, the size of the opening 117 between portions of the slider bed 116 positioned adjacent to the guide 156 may be designed such that an application of force to the continuous flexible belt 150 in the offset direction 105 does not cause the guide 156 to contact the opening 117. Thus, there are not significant frictional forces applied to the continuous flexible belt 150 resisting movement in the direction of travel 102, which would require additional application of force from the drive roller 120 to the continuous flexible belt 150 to overcome.

Figure 6:
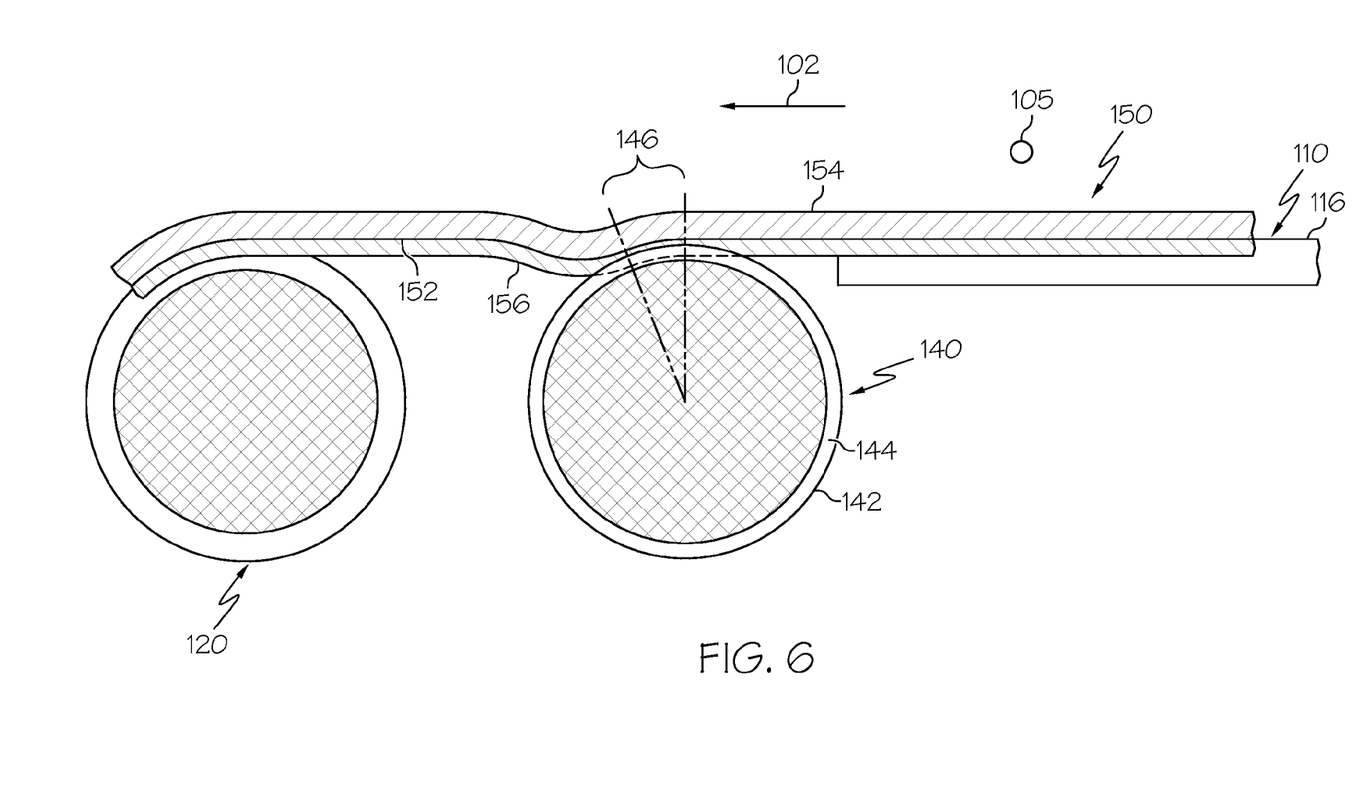
FIG. 6 schematically depicts a side sectional view of the conveyor system having intermediate rollers along line A-A of FIG. 1, depicting the first intermediate roller and the continuous flexible belt.

Referring now to FIG. 6, because the first intermediate roller 140 is free to rotate independently of the drive roller 120, the actuation load does not tend to lift the continuous flexible belt 150 away from the slider bed 116 of the frame 110, the first intermediate roller 140, or the drive roller 120. The actuation load applied to the continuous flexible belt 150 in the offset direction 105 is reacted by the first and/or second intermediate rollers 140, 160 (not shown). Because the first and second intermediate rollers 140, 160 are free to rotate independently of the drive roller 120, the first and second intermediate rollers 140, 160 are also free to rotate independently of the feed speed of the continuous flexible belt 150. When the actuation load is applied to the continuous flexible belt 150, the guide 156 contacts the channel 144 in a contact zone 146, or the region of the channel 144 that contacts the guide 156. With the guide 156 contacting the contact zone 146 of the first intermediate roller 140, the first intermediate roller 140 is rotated due to the friction force between the guide 156 and the channel 144. The friction force between the guide 156 and the channel 144 may tend to draw the guide 156 downward, in the direction of rotation of the first intermediate roller 140. By drawing the guide 156 downwards in the direction of rotation of the first intermediate roller 140, the guide 156 also draws the exterior surface 154 of the continuous flexible belt 150 downwards, and prevents the continuous flexible belt 150 from lifting away from the first intermediate rollers 140. Similar phenomenon drawing the guide 156 downwards in the direction of rotation of the second intermediate roller 160 may be exhibited.

In some embodiments, the conveyor system 100 according to the present disclosure may prevent slippage of the continuous flexible belt 150 relative to the drive roller 120 by allowing the drive roller 120 to continue to apply a drive torque to the continuous flexible belt 150 in the direction of travel 102. Slippage of the continuous flexible belt 150 relative to the drive roller 120 may induce wear in the continuous flexible belt 150, which leads to premature failure of the continuous flexible belt 150, and down-time of the conveyor system 100. Further, because the likelihood of slippage is reduced, no additional surface treatment of the drive roller 120 is required to transfer torque to the continuous flexible belt 150. The friction force between the drive roller 120 and the continuous flexible belt 150 due to the tension of the continuous flexible belt 150 is sufficient for the drive roller 120 to apply driving force to the continuous flexible belt 150.

Figure 7:
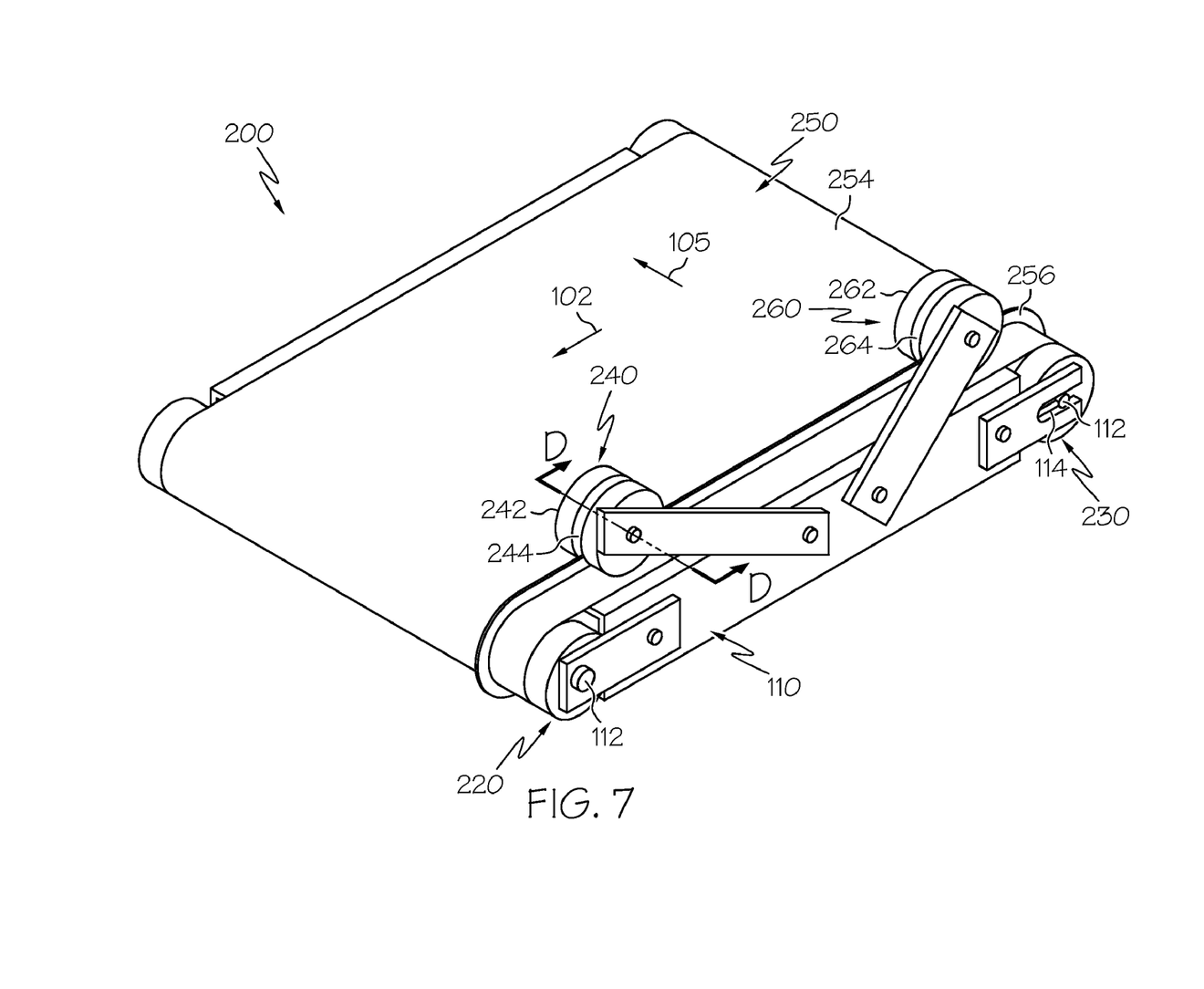
FIG. 7 schematically depicts a perspective view of a conveyor system having intermediate rollers according to one or more embodiments shown or described herein.

Referring to FIG. 7, another embodiment of the conveyor system 200 is depicted. In this embodiment, the conveyor system 200 includes a frame 110, a drive roller 220 carried by the frame 110, and a tail roller 230 carried by the frame 110. The drive roller 220 and the tail roller 230 are coupled to the frame 110 with bearing elements 112. The bearing elements 112 allow the respective drive roller 220 or tail roller 230 to rotate freely. Both of the bearing elements 112 may be coupled to the frame 110 with position adjustors 114. The position adjustors 114 allow a user to modify the distance between the tail roller 230 and the drive roller 220, thereby adjusting the tension on the continuous flexible belt 250.

The conveyor system 200 further includes a continuous flexible belt 250. The continuous flexible belt 250 includes an interior surface 252, an exterior surface 254, and a guide 256 extending outwards from the exterior surface 254. The continuous flexible belt 250 is positioned to contact the drive roller 220 and the tail roller 230.

The conveyor system 200 also includes a first intermediate roller 240 positioned between the drive roller 220 and the tail roller 230. The first intermediate roller 240 includes a channel 244 positioned around a first intermediate roller circumference 242. In some embodiments, the conveyor system 200 also includes a second intermediate roller 260 positioned between the first intermediate roller 240 and the tail roller 230. The second intermediate roller 260 includes a channel 264 positioned around a second intermediate roller circumference 262. The first intermediate roller 240 and the second intermediate roller 260 are free to rotate independently of one another and independently of the drive roller 220 and the tail roller 230. The first intermediate roller 240 and the second intermediate roller 260 may each be secured to the frame 110 with bearings that maintain the position of the first intermediate roller 240 and the second intermediate roller 260, and to allow independent rotation.

The continuous flexible belt 250 includes an interior surface 252 (depicted in FIG. 9), an exterior surface 254, and a guide 256 extending outwards from the exterior surface 254. The continuous flexible belt 250 is positioned to contact the drive roller 220 and the tail roller 230. As the drive roller 220 rotates, frictional force between drive roller 220 and the continuous flexible belt 250 induce the continuous flexible belt 250 to feed around the drive roller 220 and the tail roller 230 in a direction of travel 102. The guide 256 of the continuous flexible belt 250 is positioned within the channels 244, 264 of the first and second intermediate rollers 240, 260. In some embodiments, the guide 256 of the continuous flexible belt 250 is sized and spaced relative to the channels 244, 264 of the first and second intermediate rollers 240, 260 such that the guide 256 intermittently contacts the channels 244, 264.

Figure 8:
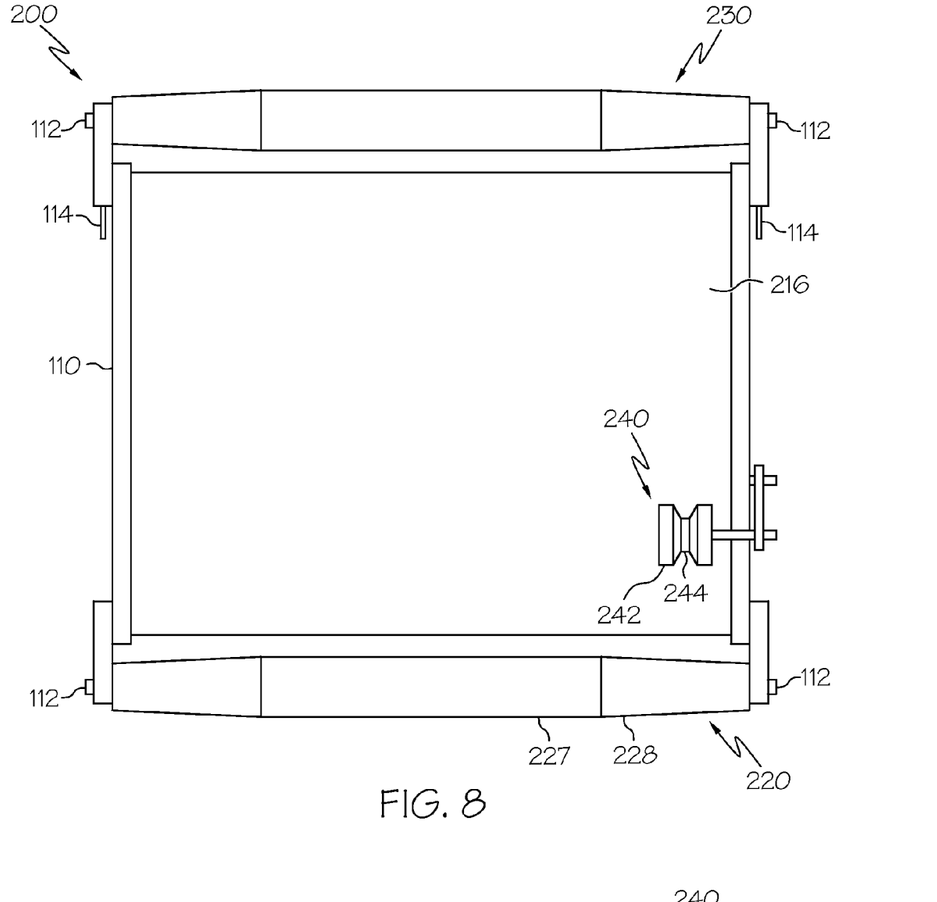
FIG. 8 schematically depicts a top view of a conveyor system having intermediate rollers with the continuous flexible belt removed for clarity according to one or more embodiments shown or described herein.

Referring to FIG. 8, the frame 110 further includes a slider bed 216 positioned along an upper side of the frame 110. The slider bed 216 is uninterrupted across its width. The slider bed 216 provides support to the continuous flexible belt 250 between the tail roller 230 and the drive roller 220. In the embodiment depicted in FIG. 8, the drive roller 220 is crowned and includes a center section 227 surrounded by tapered end sections 228. Similar to the previous embodiment discussed above, the drive roller 220 applies a centering force to the continuous flexible belt 250 that tends to center the continuous flexible belt 250 along the frame 110.

Figure 9:
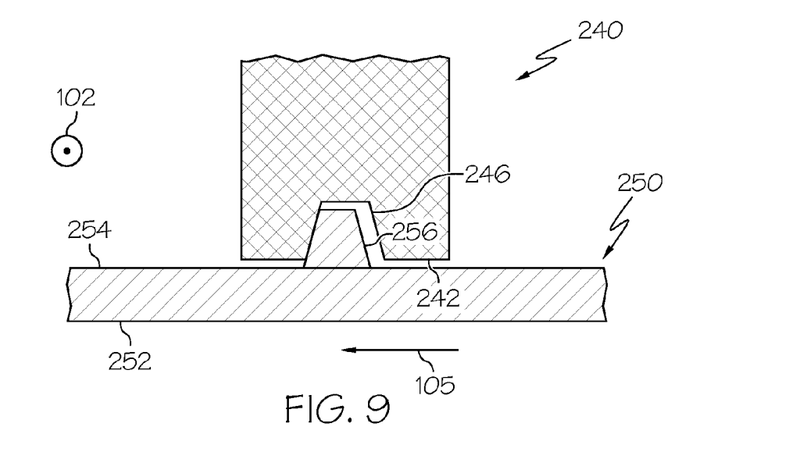
FIG. 9 schematically depicts a front sectional view of the conveyor system having intermediate rollers along line D-D of FIG. 7.

While the tapered end sections 228 of the drive roller 220 may maintain the straight tracking of the continuous flexible belt 250, as discussed hereinabove, the application of an actuation load to the continuous flexible belt 250 in a direction transverse to the direction of travel 102 (i.e. in the offset direction 105) of the continuous flexible belt 250 may tend to drive the continuous flexible belt 250 away from tracking straight. Referring now to FIG. 9, because of the positioning of the first intermediate roller 240 and the second intermediate roller 260 (not shown), the guide 256 extending from the exterior surface 254 of the continuous flexible belt 250 contacts the channels 244, 264, thereby limiting the lateral movement of the continuous flexible belt 250 in a direction transverse to the direction of travel 102.

It should now be understood that conveyor systems according to the present disclosure include intermediate rollers that are positioned between the drive roller and the tail roller and resist force applied in a direction transverse to the direction of travel of the continuous flexible belt. The intermediate rollers allow for the intermittent transverse loading to be resisted independently from the forces applied to the continuous flexible belt to maintain straight tracking. The relative spacing of a guide on the continuous flexible belt and the intermediate rollers provides resistance to the continuous flexible belt that maintains straight tracking while minimizing drag between the guide and the intermediate rollers. Minimizing drag reduces wear on the guide and the intermediate rollers, which extends the useful life of the continuous flexible belt. Reducing the drag also reduces the power required to be applied to the drive roller to operate the conveyor system. The intermediate rollers may allow for the use of smaller diameter drive rollers and tail rollers, while maintaining tracking of the continuous flexible belt.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A conveyor system comprising:
   a frame;
   a drive roller carried by the frame, the drive roller comprising a drive roller relief channel positioned around a drive roller circumference;
   a tail roller carried by the frame, the tail roller comprising a tail roller relief channel positioned around a tail roller circumference;
   a first intermediate roller positioned between the drive roller and the tail roller and carried by the frame, the first intermediate roller comprising a channel positioned around a first intermediate roller circumference; and
   a continuous flexible belt positioned around the drive roller and the tail roller, the continuous flexible belt comprising an exterior surface, an interior surface, and a guide extending inwards from the interior surface,
   wherein the guide is positioned within the channel of the first intermediate roller and the guide is spaced apart from the drive roller relief channel and the tail roller relief channel.

2. The conveyor system of claim 1, wherein when an actuation load is applied to the continuous flexible belt in a direction generally transverse to the direction of travel, the guide contacts the channel of the first intermediate roller.

3. The conveyor system of claim 2, wherein the guide remains spaced apart from the drive roller relief channel and the tail roller relief channel.

4. The conveyor system of claim 1, wherein the frame comprises a slider bed positioned along an upper side of the frame, the slider bed comprising an opening that is generally parallel with the drive roller relief channel and the tail roller relief channel, and the guide is spaced apart from the opening.

5. The conveyor system of claim 4, wherein when an actuation load is applied to the continuous flexible belt in a direction generally transverse to the direction of travel, the guide remains spaced apart from the opening.

6. The conveyor system of claim 1, further comprising a second intermediate roller positioned between the first intermediate roller and the tail roller, the second intermediate roller comprising a channel positioned around a second intermediate roller circumference.

7. The conveyor system of claim 6, further comprising a third intermediate roller positioned between the first intermediate roller and the second intermediate roller, the third intermediate roller comprising a channel positioned around a third intermediate roller circumference.

8. The conveyor system of claim 1, wherein at least one of the drive roller or the tail roller is crowned.

9. The conveyor system of claim 1, wherein the first intermediate roller is free to rotate in a direction of rotation independently from the drive roller and the tail roller.

10. The conveyor system of claim 4, wherein the interior surface of the continuous flexible belt is spaced apart from the first intermediate roller circumference along the slider bed.

11. The conveyor system of claim 1, wherein when no transverse load is applied to the continuous flexible belt, the guide is spaced apart from the channel of the intermediate roller, and when a transverse load is applied to the continuous flexible belt, the guide contacts the channel of the intermediate roller.

12. The conveyor system of claim 1, further comprising a drive shaft coupled to the drive roller, wherein the drive shaft rotates the drive roller to apply a conveyance force to the continuous flexible belt.

13. The conveyor system of claim 1, wherein the first intermediate roller circumference is smaller than the drive roller circumference and the tail roller circumference.

14. The conveyor system of claim 1, wherein the channel of the first intermediate roller is v-shaped and the guide of the continuous flexible belt is v-shaped.

15. A conveyor system comprising:
    a frame;
    a drive roller carried by the frame;
    a tail roller carried by the frame;
    a continuous flexible belt positioned around the drive roller and the tail roller, wherein the continuous flexible belt comprises an exterior surface, and interior surface, and a guide extending outwards from the exterior surface; and
    a first intermediate roller positioned between the drive roller and the tail roller, wherein the first intermediate roller comprises a channel positioned around a first intermediate roller circumference, wherein the guide is positioned within the channel of the first intermediate roller.

16. The conveyor system of claim 15, wherein when an actuation load is applied to the continuous flexible belt in a direction generally transverse to the direction of travel, the guide contacts the channel of the first intermediate roller.

17. The conveyor system of claim 15, further comprising a second intermediate roller positioned between the first intermediate roller and the tail roller, wherein the second intermediate roller comprises a channel positioned around a second intermediate roller circumference, wherein the guide is positioned within the channel of the second intermediate roller.

18. The conveyor system of claim 15, wherein at least one of the drive roller or the tail roller is crowned.

19. The conveyor system of claim 15, wherein the first intermediate roller is free to rotate in a direction of rotation independently from the drive roller and the tail roller.

20. The conveyor system of claim 15, wherein the channel of the first intermediate roller is v-shaped and the guide of the continuous flexible belt is v-shaped.

* * * * *